United States Patent
Ozawa et al.

(10) Patent No.: US 6,713,171 B2
(45) Date of Patent: Mar. 30, 2004

(54) MAGNETIC RECORDING MEDIUM

(75) Inventors: Takako Ozawa, Odawara (JP); Hiroaki Doushita, Odawara (JP); Takeshi Harasawa, Odawara (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 35 days.

(21) Appl. No.: 10/216,831

(22) Filed: Aug. 13, 2002

(65) Prior Publication Data

US 2003/0118869 A1 Jun. 26, 2003

(30) Foreign Application Priority Data

Aug. 14, 2001 (JP) ........................................ 2001-246128

(51) Int. Cl.$^7$ ............................................... G11B 5/706
(52) U.S. Cl. ................ 428/323; 428/329; 428/694 BN; 428/694 BH
(58) Field of Search ................................ 428/323, 329, 428/694 BN, 694 BH

(56) References Cited

U.S. PATENT DOCUMENTS 6,312,796 B1 * 11/2001 Zinbo ......................... 428/323
6,641,891 B2 * 11/2003 Doushita et al. ........... 428/65.3

* cited by examiner

*Primary Examiner*—Stevan A. Resan
(74) *Attorney, Agent, or Firm*—Sughrue Mion, PLLC

(57) ABSTRACT

Provided is a magnetic recording medium having improved electromagnetic characteristics, particularly, in which the C/N ratio in the high-density recording region is markedly improved. The magnetic recording medium comprises a nonmagnetic layer comprising a nonmagnetic powder and a binder and a magnetic layer comprising a ferromagnetic hexagonal ferrite powder and a binder in this order on a support. The number of magnetic aggregates present in the magnetic layer that are equal to or higher than 0.5 $\mu$m in size and have a magnetic intensity equal to or greater than 20 times the average value of magnetization turbulence obtained from a magnetic force image measured by a magnetic force microscope is equal to or less than 100/2,000 $\mu$m$^2$.

9 Claims, No Drawings

MAGNETIC RECORDING MEDIUM

FIELD OF THE INVENTION

The present invention relates to a particulate magnetic recording medium for high-density recording. In particular, the present invention relates to a magnetic recording medium for high-density recording comprising a magnetic layer comprising a hexagonal ferrite powder and an substantially nonmagnetic lower layer.

BACKGROUND OF THE INVENTION

With the widespread popularity of office computers such as minicomputers, personal computers and workstations in recent years, considerable researches have been conducted into magnetic tapes (so-called "backup tapes") for recording computer data as external memory devices. In the course of the practical development of magnetic tapes for such applications, particularly when combined with size reduction and increased information processing capability in computers, there has been a strong demand for increased recording capacity to achieve high-capacity recording and size reduction.

Magnetic recording media, in which a magnetic layer, comprising iron oxide, Co-modified iron oxide, $CrO_2$, a ferromagnetic metal powder, and/or hexagonal ferrite powder dispersed in a binder, is coated on a nonmagnetic support are widely employed. Of these, hexagonal ferrite powder is known to have good high-density recording characateristics. Further, the use of an MR head in reproduction is known to yield a low noise level and a higher C/N ratio (Japanese Unexamined Patent Publication (KOKAI) Heisei No. 10-302243).

The use of hexagonal ferrite powders with good high-density recording characteristics such as barium ferrite powder in the magnetic layer in this fashion has drawn attention. However, since hexagonal ferrite powders such as barium ferrite powder are plate-shaped and have an easily magnetized magnetic domain perpendicular to the flat surfaces thereof, the plate-shaped particles tend to stack and magnetically couple, increasing noise. Thus, it is necessary to reduce noise and improve electromagnetic characteristics.

Accordingly, the object of the present invention is to provide a magnetic recording medium employing ferromagnetic hexagonal ferrite powder such as barium ferrite, having improved electromagnetic characteristics, particularly improved high-density recording characteristics, in which the C/N ratio in the high-density recording region is markedly improved.

The present inventors conducted extensive research for achieving a magnetic recording medium having a markedly improved electromagnetic characteristics, particularly the C/N ratio in high-density recording region, resulting in the discovery that by limiting the number of magnetic aggregates having a size and magnetic intensity equal to or greater than a prescribed level present in the magnetic layer to equal to or less than $100/2,000\ \mu m^2$, it was possible to reduce noise and obtain a magnetic recording medium having good electromagnetic characteristics; the present invention was devised on this basis.

SUMMARY OF THE INVENTION

That is, the magnetic recording medium of the present invention is comprised of a nonmagnetic layer comprising a nonmagnetic powder and a binder and a magnetic layer comprising a ferromagnetic hexagonal ferrite powder and a binder in this order on a support, and is characterized in that the number of magnetic aggregates present in the magnetic layer that are equal to or higher than $0.5\ \mu m$ in size and have a magnetic intensity equal to or greater than 20 times the average value of magnetization turbulence obtained from a magnetic force image obtained by a magnetic force microscope is equal to or less than $100/2,000\ \mu m^2$.

The "magnetic aggregates" referred to here are those observed as specific points in magnetic force images obtained by observation by a magnetic force microscope (MFM) on the magnetic layer surface after DC erasure. They are caused by a larger magnetic flux only in the portion than in the other portions by large magnetic aggregates.

The "magnetic aggregates" the number of which is considered in the present invention are equal to or greater than $0.5\ \mu m$ in size and have a magnetic intensity of 20 times or more the average value of magnetization turbulence obtained from a magnetic force image obtained by observation by a magnetic force microscope.

Here, the term "magnetization turbulence" denotes the nonuniformity of magnetization (unit) due to the magnetic aggregates. It can be obtained by measuring the size of the partial magnetic aggregates observed following DC erasure with an MFM. In the MFM, a magnet is employed as the probe in an atomic force microscope (AFM) and the magnetic force can be measured by the same method as in AFM. "Magnetization turbulence" is measured as follows.

A $40\ \mu m$ square of DC-erased medium is measured with an MFM, and five visual fields are taken. The surface roughness Ra equation is applied to each of magnetic force image data, and the average magnetization turbulence value A (mean value of magnetization turbulence) is calculated. The number of "magnetic aggregates" with a magnetic intensity equal to or greater than 20 times average magnetization turbulence value A and having a size equal to or greater than $0.5\ \mu m$ is counted. It is thus possible to obtain the number of "magnetic aggregates" per $2,000\ \mu m^2$.

In the present invention, the number of magnetic aggregates present in the magnetic layer having a size equal to or greater than $0.5\ \mu m$ and having a magnetic intensity equal to or greater than 20 times the average value of the magnetization turbulence obtained from a magnetic force image by a magnetic force microscope is equal to or less than $100/2,000\ \mu m^2$.

When recording and reproducing at a linear recording density of 100 kfci (about $0.5\ \mu m$), at the size of magnetic aggregates equal to $0.5\ \mu m$, magnetization inversion reached the critical point and medium noise deteriorates substantially. Thus, the size of magnetic aggregates is set to equal to or greater than $0.5\ \mu m$ in view of an effect on medium noise.

Further, in the present invention, the magnetic intensity of the magnetic aggregates the number of which is specified as being equal to or less than $100/2,000\ \mu m^2$ is set to "20 times the average value of magnetization turbulence obtained from a magnetic force image by magnetic force microscope". This is because magnetic aggregates recognized as a phase shift when recording a recording signal are those having 20 times or more magnetic intensity, and magnetic aggregates with a intensity less than 20 times cause no problem during reproduction.

A large quantity of magnetic aggregates of the above-stated size and magnetic intensity causes an increase in medium noise and deterioration of electromagnetic characteristics, and makes a medium unsuited to high-density recording. Accordingly, the number of such magnetic aggregates is limited to equal to or less than $100/2,000$ $\mu m^2$, preferably equal to or less than $50/2,000\ \mu m^2$, and more preferably, equal to or less than $30/2,000\ \mu m^2$. The number of magnetic aggregates would ideally be $0/2,000\ \mu m^2$, but the practical lower limit is about $5/2,000\ \mu m^2$.

The magnetic aggregates in the magnetic layer result from the aggregation of a ferromagnetic hexagonal ferrite powder and abrasives contained in the layer. Accordingly, in order to adjust the number of magnetic aggregates equal to or greater than 0.5 $\mu m$ in size and having an intensity of A×20 or more in the magnetic layer to equal to or less than $100/2,000\ \mu m^2$, dispersion of the ferromagnetic hexagonal ferrite powder in the magnetic coating liquid is to be improved or aggregation of abrasives is to be reduced. To this end, the following methods can be employed:

(1) Dispersing the magnetic coating liquid comprising a ferromagnetic hexagonal ferrite powder and a binder is conducted for at least 10 hours, preferably 20 to 24 hours.

Conventionally, dispersion is conducted for 3 to 8 hours. In the present invention, the same conditions are employed as in the conventional method with the exception of the dispersion period, which is made longer than in the conventional method to achieve a prescribed number of magnetic aggregates described above.

(2) Zirconia beads are employed as dispersion beads. Glass beads or zirconia beads have conventionally been employed to prepare the coating liquid for the magnetic layer. However, zirconia beads disperse better and are a dispersion medium of higher specific gravity than glass beads, and the use of zirconia beads enhances dispersion and tends to inhibit the generation of magnetic aggregates. In particular, the use of microgranular zirconia beads (for example, 0.1 to 1 mmΦ, preferably 0.1 to 0.3 mmΦ) improves dispersion efficiency. Accordingly, the use of microgranular zirconia beads in combination with an extended dispersion period can be used to adjust the number of magnetic aggregates to a prescribed level.

(3) The presence of large abrasive particles dislodges magnetic material, causing increased noise. Accordingly, reduction of quantity and size of the abrasive can reduce magnetic aggregates. The use of abrasive with a particle size of 0.1 to 0.3 $\mu m$, preferably 0.1 to 0.2 $\mu m$ and a quantity of abrasive of 1 to 10 parts, preferably 1 to 4 parts, per 100 parts of magnetic material permits adjustment of the number of magnetic aggregates to the above-prescribed level.

(4) Employing a ferromagnetic hexagonal ferrite powder, such as barium ferrite, of relatively small particle size makes it possible to suppress the number of magnetic aggregates. For example, the use of ferromagnetic hexagonal ferrite powder with a plate diameter equal to or less than 0.038 $\mu m$, preferably equal to or less than 0.033 $\mu m$, permits adjustment of the number of magnetic aggregates to the prescribed level mentioned above.

According to the present invention, a magnetic recording medium, in particular, a computer tape having good high-density recording characteristics, in particular, a markedly improved C/N ratio in the high-density region can be obtained.

Magnetic Layer

The upper and lower layers of the magnetic recording medium of the present invention can be manufactured by providing an upper magnetic layer while the lower layer is still wet (W/W) or after dried (W/D) following coating the lower layer. From the perspective of increasing the production yield, simultaneous or sequential W/W coating is preferable, but W/D coating may be sufficiently employed. In multilayer configurations (configurations comprising a nonmagnetic lower layer and a magnetic upper layer), simultaneous or sequential W/W manufacturing permits the simultaneous formation of the upper and lower layers. Thus, a surface processing step such as calendering can be effectively employed to improve the surface roughness of even ultrathin upper magnetic layers.

The coercivity Hc of the magnetic layer is desirably equal to or greater than 143 kA/m (1,800 Oe), for example, and the ferromagnetic hexagonal ferrite powder such as barium ferrite incorporated into the magnetic layer desirably has a Bm of 100 to 300 mT (1,000 to 3,000 G).

Ferromagnetic Hexagonal Ferrite Powder

Examples of hexagonal ferrite particles comprised in the magnetic layer of the present invention are various substitution products of barium ferrite, strontium ferrite, lead ferrite, and calcium ferrite, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

The particle size is, as a hexagonal plate diameter, 10 to 200 nm, preferably 10 to 100 nm, and more preferably 10 to 80 nm. Particularly when employing magnetoresistive heads in reproduction for increasing track density, a plate diameter equal to or less than 40 nm is desirable to reduce noise. At equal to or less than 10 nm, stable magnetization cannot be achieved due to thermal fluctuation. The hexagonal plate diameter equal to or less than 200 nm permits low noise and is suited to high-density magnetic recording. The plate ratio (plate diameter/plate thickness) is desirably 1 to 15, preferably 1 to 7. Although small plate ratio is desirable because of high filling property, adequate orientation is hardly achieved. If the plate ratio is equal to or less than 15, noise can be prevented due to stacking between particles.

The specific surface area by BET method of the particle having a particle size within the above-mentioned range is 10 to 200 $m^2/g$, almost corresponding to an arithmetic value from the particle plate diameter and the plate thickness. Narrow distributions of particle plate diameter and thickness are normally good. Although difficult to render in number form, 500 particles can be randomly measured in a TEM photograph of particles to make a comparison. This distribution is often not a normal distribution. However, when expressed as the standard deviation to the average size, σ/average size=0.1 to 2.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known.

A coercive force (Hc) of the hexagonal ferrite powder as measured in the magnetic material of about 40 to 398 kA/m (5000 to 50000 Oe) can normally be achieved. A high Hc is advantageous for high-density recording, but this is limited by the capacity of the recording head. The Hc in the present invention is about 143 to 318 kA/m (18000 to 40000 Oe), preferably 143 to 279 kA/m (18000 to 35000 Oe). When the saturation magnetization of the head exceeds 1.4 T, a coercive force equal to or higher than 159 kA/m (20000 Oe) is desirable. The Hc can be controlled by particle size (plate diameter and plate thickness), the types and quantities of elements contained, substitution sites of the element, the particle producing reaction conditions, and the like. The saturation magnetization (σs) is 40 to 80 Am$^2$/kg. Higher σs is preferred, but the σs tends to decrease with decreasing particle size. Known methods of improving σs are combining spinel ferrite with magnetoplumbite ferrite, selection of the type and quantity of elements incorporated, and the like. It is also possible to employ W-type hexagonal ferrite magnetic powder.

When dispersing magnetic material (hexagonal ferrite), the surface of the magnetic material particles is processed with a substance suited to a dispersion medium and a polymer. Both organic and inorganic compounds can be employed as surface treatment agents. Examples of the principal compounds are compounds of Si, Al, P, and the like; various silane coupling agents; and various titanium coupling agents. The quantity ranges from 0.1 to 10 percent relative to the magnetic material. The pH of the magnetic material is also important to dispersion. A pH of 4 to 12 is usually optimum for the dispersion medium and polymer. From the perspective of the chemical stability and storage properties of the medium, a pH of about 6 to 11 can be selected. Moisture contained in the magnetic material also affects dispersion. There is an optimum level for the dispersion medium and polymer, usually selected from the range of 0.01 to 2.0 percent. Methods of manufacturing hexagonal ferrite include (1) the glass crystallization method in which a metal oxide substituted with barium oxide, iron oxide, and iron, and a glass-forming substance in the form of boron oxide or the like are mixed in proportions designed to yield a desired ferrite composition, melted, and quenched to obtain an amorphous product, subjected to a heat treatment again, washed, and pulverized to obtain barium ferrite crystal powder; (2) the hydrothermal reaction method in which a barium ferrite composition metal salt solution is neutralized with an alkali, the by-products are removed, the solution is liquid-phase heated at equal to or higher than 100° C., and the solution is washed, dried, and pulverized to obtain barium ferrite crystal powder; and (3) the coprecipitation method in which a barium ferrite composition metal salt solution is neutralized with an alkali, the by-products are removed, and the solution is dried, processed at equal to or less than 1,100° C., and pulverized to obtain barium ferrite crystal powder. However, any methods may be employed in the present invention.

Nonmagnetic Layer

The lower layer (nonmagnetic layer) will be described in detail below. The lower layer of the present invention is substantially nonmagnetic. An inorganic powder employed is a nonmagnetic powder, which can be selected from inorganic compounds such as metal oxides, metal carbonates, metal sulfates, metal nitrides, metal carbides, metal sulfides and the like. Examples of inorganic compounds are α-alumina having an α-conversion rate equal to or higher than 90 percent, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and α-iron oxide. The particle size of these nonmagnetic powders preferably ranges from 0.005 to 2 μm, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 μm. Particularly when the nonmagnetic powder is a granular metal oxide, a mean particle diameter equal to or less than 0.08 μm is preferred, and when an acicular metal oxide, the major axis length is preferably equal to or less than 0.3 μm, more preferably equal to or less than 0.2 μm. The tap density ranges from 0.05 to 2 g/ml, preferably from 0.2 to 1.5 g/ml. The moisture content of the nonmagnetic powder ranges from 0.1 to 5 weight percent, preferably from 0.2 to 3 weight percent, further preferably from 0.3 to 1.5 weight percent. The pH of the nonmagnetic powder ranges from 2 to 11, and the pH between 5.5 to 10 is particular preferred. The specific surface area of the nonmagnetic powder ranges from 1 to 100 m$^2$/g, preferably from 5 to 80 m$^2$/g, further preferably from 10 to 70 m$^2$/g. The crystallite size of the nonmagnetic powder preferably ranges from 0.004 to 1 μm, further preferably from 0.04 to 0.1 μm. The oil absorption capacity using dibutyl phthalate (DBP) ranges from 5 to 100 ml/100 g, preferably from 10 to 80 ml/g, further preferably from 20 to 60 ml/100 g. The specific gravity ranges from 1 to 12, preferably from 3 to 6. The shape of the nonmagnetic powder may be any of acicular, spherical, polyhedral, or plate-shaped. The Mohs' hardness is preferably 4 to 10. The stearic acid (SA) adsorption capacity of the nonmagnetic powders ranges from 1 to 20 μmol/m$^2$, preferably from 2 to 15 μmol/m$^2$, further preferably from 3 to 8 μmol/m$^2$. The pH between 3 to 6 is preferred. The surface of these nonmagnetic powders is preferably treated with $Al_2O_3$, $SiO_2$, $TiO_2$, $ZrO_2$, $SnO_2$, $Sb_2O_3$, ZnO and $Y_2O_3$. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the lower layer of the present invention are: Nanotite from Showa Denko K. K.; HIT-100 and ZA-G1 from Sumitomo Chemical Co., Ltd.; α-hematite DPN-250, DPN-250BX, DPN-245, DPN-270BX, DPN-500BX, DBN-SA1 and DBN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Carbon black can be added additionally to the lower layer of the present invention. Mixing carbon black achieves the known effects of lowering surface resistivity Rs and reducing light transmittance, as well as yielding the desired micro Vickers hardness. Further, the incorporation of carbon black into the lower layer can also serve to store lubricants. Examples of types of carbon black that are suitable for use are furnace black for rubber, thermal for rubber, black for coloring and acetylene black. Based on the effect desired, the following characteristics should be optimized in the carbon black in the lower layer, and effects may be achieved by using different carbon blacks in combination.

The specific surface area of carbon black employed in the lower layer ranges from 100 to 500 $m^2/g$, preferably from 150 to 400 $m^2/g$, and the DBP oil absorption capacity ranges from 20 to 400 ml/100 g, preferably from 30 to 400 ml/100 g. The particle diameter of carbon black ranges from 5 to 80 nm, preferably from 10 to 50 nm, further preferably from 10 to 40 nm. It is preferable for carbon black that the pH ranges from 2 to 10, the moisture content ranges from 0.1 to 10 percent and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent with respect to the inorganic powder above and does not exceed 40 percent with respect to the total weight of the nonmagnetic layer. These types of carbon black may be employed singly or in combination. The *Carbon Black Handbook* compiled by the Carbon Black Association may be consulted for types of carbon black suitable for use in the present invention.

Based on the objective, an organic powder may be added to the lower layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

Known techniques for the magnetic layer, nonmagnetic layer and backcoat layer can be adopted to binders, lubricants, dispersing agents, additives, solvents, dispersion methods and the like for the magnetic layer, nonmagnetic layer and backcoat layer optionally provided.

Binder

Conventionally known thermoplastic resins, thermosetting resins, reactive resins and mixtures thereof may be employed as binders employed in the magnetic layer and the lower layer (nonmagnetic layer) of the present invention. The thermoplastic resins have a glass transition temperature of −100 to 150° C., have a number average molecular weight of 1,000 to 200,000, preferably 10,000 to 100,000, and have a degree of polymerization of about 50 to 1,000.

Examples are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten. In addition, known electron beam-curing resin can be employed in individual layers. These examples and methods of manufacturing them are described in detail in Japanese Unexamined Patent Publication (KOKAI) Showa No. 62-256219. The above-described resins may be employed singly or in combination. The preferred resin is a combination of polyurethane resin and one or more selected from among vinyl chloride resin, vinyl chloride vinyl acetate copolymer, vinyl chloride vinyl acetate vinyl alcohol copolymer, and vinyl chloride vinyl acetate maleic anhydride copolymer; or a resin obtained by mixing polyisocyanate into one of the above.

Known polyurethane resins may be employed, such as polyester polyurethane, polyether polyurethane, polyether polyester polyurethane, polycarbonate polyurethane, polyester polycarbonate polyurethane, and polycaprolactone polyurethane. A binder obtained by incorporating as needed one or more polar groups selected from among —COOM, —SO$_3$M, —OSO$_3$M, —P=O(OM)$_2$, and —O—P=O (OM)$_2$ (where M denotes a hydrogen atom or an alkali metal base), —OH, —NR$_2$, —N$^+$R$_3$ (where R denotes a hydrocarbon group), epoxy group, —SH, and —CN into any of the above-listed binders by copolymerization or addition reaction to improve dispersion properties and durability is desirably employed. The quantity of such a polar group ranges from $10^{-1}$ to $10^{-8}$ mol/g, preferably from $10^{-2}$ to $10^{-6}$ mol/g.

Specific examples of the binders suitable for use in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The binder is employed in a quantity of 5 to 50 percent, preferably 10 to 30 percent relative to the nonmagnetic powder or the magnetic powder in the nonmagnetic layer and the magnetic layer of the present invention. When employing vinyl chloride resin, the quantity of binder added is preferably from 5 to 30 percent; when employing polyurethane resin, from 2 to 20 percent; and when employing polyisocyanate, from 2 to 20 percent. They may be employed in combination. However, for example, when head corrosion occurs due to the release of trace amounts of chlorine, polyurethane alone or just polyurethane and isocyanate may be employed. When polyurethane is employed in the present invention, the glass transition temperature ranges from −50 to 150° C., preferably from 0 to 100° C.; the elongation at break desirably ranges from 100 to 2,000 percent; the stress at break desirably ranges from 0.05 to 10 kg/mm$^2$; and the yield point desirably ranges from 0.05 to 10 kg/mm$^2$.

The magnetic recording medium of the present invention comprises at least two layers. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in the nonmagnetic layer and each of the magnetic layers as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

Examples of polyisocyanates suitable for use in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in each of layers by exploiting differences in curing reactivity.

Carbon Black, Abrasive

Examples of types of carbon black that are suitable for use in the magnetic layer of the present invention are: furnace black for rubber, thermal for rubber, black for coloring, and acetylene black. It is preferable that the specific surface area is 5 to 500 m$^2$/g, the DBP oil absorption capacity is 10 to 400 ml/100 g, the particle diameter is 5 to 300 nm, the pH is 2 to 10, the moisture content is 0.1 to 10 percent, and the tap density is 0.1 to 1 g/cc. Specific examples of types of carbon black employed in the present invention are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the magnetic coating material. These carbon blacks may be used singly or in combination. When employing carbon black, the quantity preferably ranges from 0.1 to 30 percent with respect to the magnetic material. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the upper magnetic layer and the lower nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association may be consulted for types of carbon black suitable for use in the magnetic layer of the present invention.

Known materials, chiefly with a Mohs' hardness equal to or higher than 6, such as α-alumina having an α-conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives employed in the present invention. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 percent. The particle size of these abrasives ranges from 0.1 to 0.3 μm, preferably from 0.1 to 0.2 μm, and the amount of abrasives employed is 1 to 10 parts, preferably 1 to 4 parts relative to 100 parts of the magnetic material, from the perspective of restricting the number of the magnetic aggregates within the prescribed number as set forth above. Narrow particle size distribution is preferred to improve electromagnetic characteristics. As needed to improve durability, abrasives of differing particle size may be combined or the same effect may be achieved by broadening the particle diameter distribution even with a single abrasive. A tap density of 0.3 to 2 g/cc, a moisture content of 0.1 to 5 percent, a pH of 2 to 11, and a specific surface area of 1 to 30 m$^2$/g are desirable. The abrasive employed in the present invention may be any of acicular, spherical, or cubic in shape, but shapes that are partially angular have good abrasion properties and are thus preferred.

Specific examples of abrasives are: AKP-12, AKP-15, AKP-20, AKP-30, AKP-50, HIT-20, HIT-30, HIT-55, HIT-60A, HIT-70, HIT-80 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibidene Co.; and B-3 from Showa Mining Co., Ltd. As needed, these abrasives may be added to the nonmagnetic layer. Addition to the nonmagnetic layer permits control of surface shape and control of the manner in which the abrasive protrudes. It is, as a matter of course, preferred that the particle diameter and quantity of abrasive added to the magnetic layer are optimally established so as to yield the number of magnetic aggregates within the range of the present invention as set forth above.

Additives

Substances having lubricating effects, antistatic effects, dispersive effects, plasticizing effects, or the like may be employed as additives in the magnetic layer and nonmagnetic layer of the present invention. In particular, at least a fatty acid and a fatty acid ester are incorporated into the above-mentioned lower layer and/or magnetic layer of the present invention, and the fatty acid residues of the fatty acid and fatty acid ester are identical. Examples of fatty acids are monobasic fatty acids having 10 to 24 carbon atoms (which may contain an unsaturated bond or may be branched). Examples of fatty acid esters are monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); and fatty acid esters of monoalkyl ethers of alkylene oxide polymers. Additives other than these fatty acids and fatty acid esters that are suitable for use include molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; alpha-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkyl sulfuric acid esters and their alkali metal salts; metal salts (such as Li, Na, K, and Cu) of monobasic fatty acids (which may contain an unsaturated bond or be branched) having 10 to 24 carbon atoms; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms; fatty acid amides with 8 to 22 carbon atoms; and aliphatic amines with 8 to 22 carbon atoms.

Specific examples thereof are fatty acids of capric acid, caprylic acid, lauric acid, myristic acid, palmitic acid, stearic acid, behenic acid, oleic acid, elaidic acid, linolic acid, linolenic acid, and isostearic acid. Examples of fatty acid esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K. K.). These lubricants, antistatic agents and the like need not be 100 percent pure and may contain impurities, such as isomers, unreacted material, by-products, decomposition products, and oxides in addition to the main components. These impurities preferably comprise equal to or less than 30 percent, and more preferably equal to or less than 10 percent.

These lubricants and surfactants employed in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 percent, preferably from 2 to 25 percent with respect to the magnetic powder or nonmagnetic powder is selected.

All or some of the additives used in the present invention may be added at any stage in the process of manufacturing the magnetic layer coating liquid and the nonmagnetic layer coating liquid. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

Known organic solvents can be employed in the present invention. For example, solvents described in Japanese Unexamined Patent Publication (KOKAI) Showa No. 6-68453 can be employed.

Layer Structure

As the thickness structure of the magnetic recording medium of the present invention, the nonmagnetic support is equal to or less than 5.5 $\mu$m, preferably equal to or higher than 3.0 $\mu$m, more preferably ranging from 3.5 to 5.0 $\mu$m.

An undercoating layer for improving adhesion between the flexible nonmagnetic support and the nonmagnetic layer or magnetic layer may be provided in the magnetic recording medium employed in the present invention. The thickness of the undercoating layer ranges from 0.01 to 0.5 $\mu$m, preferably from 0.02 to 0.5 $\mu$m. The magnetic recording medium employed in the present invention may be a disk-shaped medium with double-sided magnetic layers in which a nonmagnetic layer and magnetic layer are provided on both sides of the support, or may have these layers on just one side. In that case, a backcoat layer may be provided to prevent static and correct for curling on the opposite side from the side on which the nonmagnetic layer and magnetic layer are provided. The thickness of this layer ranges from 0.1 to 4 $\mu$m, preferably from 0.3 to 2.0 $\mu$m. Known undercoating layers and backcoat layers may be employed. In addition, known backcoat layers can be employed with the exception that the number of protrusions having a height of 50 nm or more ranges from 200 to 1,000 per 10,000 $\mu$m$^2$.

The thickness of the magnetic layer of the medium of the present invention, which is optimized based on the saturation magnetization level and head gap length of the head employed and the recording signal band, is generally equal to or greater than 0.05 $\mu$m and equal to or less than 0.25 $\mu$m, preferably equal to or greater than 0.05 $\mu$m and equal to or less than 0.20 $\mu$m. The magnetic layer may be divided into two or more layers having different magnetic characteristics, and known multilayered magnetic layer configurations may be employed.

The use of a thin magnetic layer structure (for example, a magnetic layer with a dry thickness of 0.05 to 0.25 μm) permits significantly improved electromagnetic characteristics as follows:

(1) Improved output in the high frequency range through improvement of characteristics at recording demagnetization;
(2) Improved overwrite characteristics; and,
(3) Assured window margins.

The thickness of the nonmagnetic lower layer in the medium of the present invention is equal to or greater than 0.2 μm and equal to or less than 5.0 μm, preferably equal to or greater than 0.3 μm and equal to or less than 3.0 μm; and still more preferably, equal to or greater than 1.0 μm and equal to or less than 2.5 μm. The lower layer of the medium of the present invention need only be a substantially nonmagnetic layer to achieve its effect. Even when comprising as impurities or intentionally trace amounts of magnetic material, the effect of the present invention is still achieved and the lower layer may be recognized as having a configuration substantially identical to that of the present invention. The substantially nonmagnetic layer exhibits a residual magnetic flux density equal to or less than 10 mT (100 G) or a coercive force equal to or less than 7,960 $A.m^2/kg$ (100 Oe), preferably exhibiting no residual magnetic flux or coercive force.

The Backcoat Layer

Generally, in magnetic tapes for computer data recording, greater repeat running properties are demanded than is the case for video tapes and audio tapes. To maintain such high running durability, the backcoat layer preferably contains carbon black and inorganic powder.

Two types of carbon black having different average particle sizes are desirably employed in combination. In this case, a microgranular carbon black having an average particle size of 10 to 20 nm and a coarse granular carbon black having an average particle size of 230 to 300 nm are desirably combined for use. Generally, the addition of a microgranular carbon such as that set forth above permits low surface electrical resistivity in the backcoat layer and low optical transmittance. Since many magnetic recording devices employ tape optical transmittance as an actuating signal, in such cases, the addition of microgranular carbon black is particularly effective. Further, the microgranular carbon black generally has a storage ability of liquid lubricants. When employed with a lubricant in combination, it contributes to a reduction in the coefficient of friction. On the other hand, the coarse granular carbon black with a particle size of 230 to 300 nm functions as a solid lubricant, forming micro protrusions on the surface of the back layer that reduce the contact surface area and contribute to a reduction in the coefficient of friction. However, there are drawbacks to the addition of a large quantity of coarse granular carbon black in that there is contact with the magnetic layer during tape winding and pits form in the magnetic layer. These result in coarsening of the surface of the magnetic layer and cause noise.

Specific products of microgranular carbon black are given below; RAVEN200B (18 nm), RAVEN1500B (17 nm) (the above products are manufactured by Columbia Carbon Co., Ltd.), BP800 (17 nm) (manufactured by Cabot Corporation), PRINTEX90 (14 nm), PRINTEX95 (15 nm), PRINTEX85 (16 nm), PRINTEX75 (17 nm) (the above products are manufactured by Degusa Co.), and #3950 (16 nm) (manufactured by Mitsubishi chemical industry Co., Ltd.). Specific products of coarse granular carbon black are given below; Thermal Black (270 nm) (manufactured by Cancarb Limited.), RAVEN MTP (275 nm) (manufactured by Columbia Carbon Co., Ltd.).

When employing two types of carbon black with differing average particle sizes in the backcoat layer, the content ratio (by weight) of microgranular carbon black of 10 to 20 nm to coarse granular carbon black of 230 to 300 nm is desirably from 98:2 to 75:25, more preferably from 95:5 to 85:15.

The content of carbon black (the sum of both when two types of carbon black are employed) in the backcoat layer is normally from 30 to 80 weight parts, preferably from 45 to 65 weight parts, per 100 weight parts of binder.

Two types of inorganic powder of differing hardness may be employed in combination. Specifically, a soft inorganic powder with a Mohs' hardness of 3 to 4.5 and a hard inorganic powder with a Mohs' hardness of 5 to 9 can be employed.

The addition of a soft inorganic powder with a Mohs' hardness of 3 to 4.5 permits stabilization of the coefficient of friction due to repeat running. Further, with a hardness falling within this range, the sliding guide poles are not shaved. The average particle size of the inorganic powder desirably ranges from 30 to 50 nm.

Examples of soft inorganic powders having a Mohs' hardness of 3 to 4.5 are: calcium sulfate, calcium carbonate, calcium silicate, barium sulfate, magnesium carbonate, zinc carbonate, and zinc oxide. These may be employed singly or in combinations of two or more. Of these, calcium carbonate is particularly preferred.

The content of soft inorganic powder in the backcoat layer preferably ranges from 10 to 140 weight parts, more preferably from 35 to 100 weight parts, per 100 weight parts of carbon black.

The addition of a hard inorganic powder with a Mohs' hardness of 5 to 9 strengthens the backcoat layer and improves running durability. The use of these inorganic powders with carbon black and the above-described soft inorganic powder decreases deterioration due to repeat sliding, yielding a strong backcoat layer. The addition of this inorganic powder imparts a suitable extent of grinding ability, reducing the adhesion of shavings to the tape guide poles or the like. In particular, when combined with a soft inorganic powder (preferably calcium carbonate), the sliding properties against the guide poles with their coarse surfaces is improved, permitting a backcoat layer with a stable coefficient of friction.

The hard inorganic powder desirably has an average particle size of 80 to 250 nm, more preferably 100 to 210 nm.

Examples of hard inorganic powders having a Mohs' hardness of 5 to 9 are: α-iron oxide, α-alumina, and chromium oxide ($Cr_2O_3$). These powders may be employed singly or in combination. Of these, α-iron oxide and α-alumina are preferred. The content of hard inorganic powder normally ranges from 3 to 30 weight parts, preferably from 3 to 20 weight parts, per 100 weight parts of carbon black.

When employing the soft inorganic powder and the hard inorganic powder together in the backcoat layer, the soft inorganic powder and the hard inorganic powder are desirably selected for use so that the difference in hardness between the soft inorganic powder and hard inorganic powder is equal to or greater than 2 (preferably equal to or greater than 2.5, more preferably equal to or greater than 3).

The above-described two types of inorganic powders of differing Mohs' hardnesses of specified average particle size and the above-described two types of carbon black of differing average particle size can be incorporated in the backcoat layer. In this combination, the incorporation of calcium carbonate as the soft inorganic powder is particularly preferred.

It is possible to incorporate lubricants into the backcoat layer. The lubricants may be suitably selected from among the examples of lubricants given for use in the above-described nonmagnetic layer and magnetic layer. The lubricants are normally added to the backcoat layer within a range of 1 to 5 weight parts per 100 weight parts of binder.

Support

The nonmagnetic support having a thickness equal to or less than 5.5 µm and a Young's modulus in the MD direction equal to or higher than 11,000 MPa can be employed in the present invention. Known films can be employed; such as polyesters such as polyethylene terephthalate and polyethylene naphthalate, polyolefins, cellulose triacetate, polycarbonates, polyamides, polyimides, polyamidoimides, polysulfones, polyaramides, aromatic polyamides, and polybenzooxazoles. The use of high-strength supports such as polyethylene naphthalate and polyamide is preferred. To change the surface roughness of the magnetic surface and base surface, a laminated support such as those described in Japanese Unexamined Patent Publication (KOKAI) Heisei No. 3-224127 may be employed as required. These supports may be subjected beforehand to corona discharge treatment, plasma treatment, adhesion-enhancing treatment, heat treatment, dust removal, or the like.

The surface roughness shape as a nonmagnetic support is freely controlled through the size and quantity of filler added to the support as needed. Examples of such fillers are oxides and carbonates of Ca, Si, Ti and the like, and organic powders such as acrylic-based one. The support desirably has a maximum height $SR_{max}$ equal to or less than 1 µm, a ten-point average roughness $SR_Z$ equal to or less than 0.5 µm, a center surface peak height $SR_P$ equal to or less than 0.5 µm, a center surface valley depth $SR_V$ equal to or less than 0.5 µm, a center-surface surface area SSr equal to or higher than 10 percent and equal to or less than 90 percent, and an average wavelength $S\lambda_a$ of 5 to 300 µm. To achieve desired electromagnetic characteristics and durability, the surface protrusion distribution of the support can be freely controlled with fillers. It is possible to control within a range from 0 to 2,000 protrusions of 0.01 to 1 µm in size per 0.1 mm².

The F-5 value of the nonmagnetic support employed in the present invention desirably ranges from 5 to 50 kg/mm². The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength ranges from 5 to 100 kg/mm². The modulus of elasticity preferably ranges from 100 to 2,000 kg/mm². The thermal expansion coefficient ranges from $10^{-4}$ to $10^{-8}$/° C., preferably from $10^{-5}$ to $10^{-6}$/° C. The moisture expansion coefficient is equal to or less than $10^{-4}$/RH percent, preferably equal to or less than $10^{-5}$/RH percent. These thermal characteristics, dimensional characteristics, and mechanical strength characteristics are desirably nearly equal, with a difference equal to less than 10 percent, in all in-plane directions.

Manufacturing Method

The process for manufacturing the coating material for magnetic layer of the magnetic recording medium employed in the present invention comprises at least a kneading step, a dispersing step, and a mixing step to be carried out, if necessary, before and/or after the kneading and dispersing steps. Each of the individual steps may be divided into two or more stages. All of the starting materials employed in the present invention, including the magnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the magnetic powder or nonmagnetic powder and all or part of the binder (preferably equal to or higher than 30 percent of the entire quantity of binder) are kneaded in a range of 15 to 500 parts per 100 parts of magnetic powder. Details of the kneading process are described in Japanese Unexamined Patent Publication (KOKAI) Heisei Nos. 1-106338 and 1-79274. Further, glass beads may be employed to disperse the coating liquid for magnetic layer and the coating liquid for lower layer, with a dispersing medium with a high specific gravity such as zirconia beads, titania beads, and steel beads being suitable for use. The particle diameter and fill ratio of these dispersing media are optimized for use. A known dispersing device may be employed.

The backcoat layer can be prepared by coating a backcoat layer coating material, in which granular components such as abrasive and antistatic agent, and the binder are dispersed in the organic solvent, on the opposite side from the magnetic layer. Since adequate dispersion properties can be achieved by employing more granulated oxide than carbon black as described above in the preferred mode, it is possible to prepare a backcoat layer coating material without employing conventionally required roll kneading. A lower carbon black content permits a reduction in the amount of residual cyclohexanone following drying even when employing cyclohexanone as solvent.

The same coating method may be selected as for the magnetic layer coating method, described further below.

The surface roughness of the backcoat layer may be adjusted to a desired level by varying the size and quantity added of granular components such as carbon black and abrasives. The use of a thin backcoat layer facilitates the appearance of granular components on the surface, permitting roughening of the surface. It is also possible to achieve a desired surface roughness by adjusting the dispersion state of the backcoat liquid. Heavy calendering may also be applied during preparation of the medium to smoothen the surface.

Methods such as the following are desirably employed when coating a multilayer-structured magnetic recording medium in the present invention;

(1) A method in which the lower layer is first applied with a coating device commonly employed to apply magnetic coating materials such as a gravure coating, roll coating, blade coating, or extrusion coating device, and the magnetic layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the magnetic and lower layers are applied nearly simultaneously using an extrusion coating apparatus with a backup roller as disclosed in Japanese Unexamined Patent Publication (KOKAI) Heisei No. 2-174965. To avoid compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. Applying the lower layer, drying it, and then applying the magnetic layer thereover in a sequential multilayer coating to achieve the structure of the present invention is also possible, and does not compromise the effect of the present invention. However, to reduce the number of voids in the coating and improve the quality as regards dropout and the like, the above-describe simultaneous multilayer coating is preferred.

In magnetic tapes, cobalt magnets and solenoids are employed to impart orientation in the longitudinal direction. The temperature and flow volume of the drying air, and coating rate are desirably controlled to control the drying position of the coating. The coating rate preferably ranges from 20 to 1,000 m/min, and the temperature of the drying air is preferably equal to or higher than 60° C. It is also possible to conduct suitable predrying prior to entering the magnet zone.

Processing may be conducted with calender rolls in the form of heat-resistant plastic rolls such as epoxy, polyimide, polyamide, and polyimidoamide, or metal rolls. When forming two-surface magnetic layers, treatment with metal rolls is particularly desirable. The processing temperature is preferably equal to or higher than 50° C., more preferably equal to or higher than 100° C. The linear pressure is desirably equal to or higher than 200 kg/cm, more preferably equal to or higher than 300 kg/cm.

Physical Properties

Because of the use of hexagonal ferrite, the saturation magnetic flux density of the magnetic layer of the magnetic recording medium of the present invention is equal to or higher than 100 mT (1,000 G) and equal to or less than 300 mT (300 G). The coercive forces Hc and Hr are equal to or higher than 119 kA/m (1,500 Oe) and equal to or less than 398 kA/m (5,000 Oe), preferably equal to or higher than 143 kA/m (1,800 Oe) to equal to or less than 239 kA/m (3,000 Oe). A narrow coercive force distribution is desirable, with the preference of SFD and SFDr being equal to or less than 0.6

The squareness is equal to or higher than 0.7, preferably equal to or higher than 0.8. It is preferable that the coefficient of friction of the magnetic recording medium of the present invention relative to the head is equal to or less than 0.5 and preferably equal to or less than 0.3 at temperatures ranging from −10° to 40° C. and humidity ranging from 0 percent to 95 percent, the specific surface resistivity desirably ranges from $10^4$ to $10^{12}$ Ω/sq on the magnetic surface, and the charge potential preferably ranges from −500 V to +500 V. The modulus of elasticity at 0.5 percent extension of the magnetic layer desirably ranges from 100 to 2,000 kg/mm$^2$ in each in-plane direction. The breaking strength desirably ranges from 10 to 70 kg/mm$^2$. The modulus of elasticity of the magnetic recording medium desirably ranges from 100 to 1,500 kg/mm$^2$ in each in-plane direction. The residual elongation is desirably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent. The glass transition temperature of the magnetic layer (i.e., the temperature at which the loss elastic modulus of dynamic viscoelasticity peaks as measured at 110 Hz) of the magnetic layer is preferably 50 to 120° C., and that of the lower nonmagnetic layer preferably ranges from 0 to 100° C. The loss elastic modulus preferably falls within a range of $1 \times 10^3$ to $8 \times 10^4$ N/cm$^2$ ($1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium. The residual solvent in the magnetic layer is preferably equal to or less than 100 mg/m$^2$ and more preferably equal to or less than 10 mg/m$^2$. The void ratio in the coated layers, including both the nonmagnetic lower layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important. Curling is preferably within ±3 mm.

If the magnetic recording medium of the present invention comprises a nonmagnetic layer and a magnetic layer, it will be readily deduced that the physical properties of the nonmagnetic layer and magnetic layer may be varied based on the objective. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

Embodiment

The present invention will be explained through the following embodiment, however, the present invention should not be limited thereto.

Embodiment 1

<Manufacture of coating material>

Magnetic coating material 1 (Hexagonal ferrite: disk)

| | |
|---|---|
| Barium ferrite magnetic powder A (microgranular BaFe): | 100 parts |
| Hc: 175.2 kA/m | |
| Plate diameter: 0.03 µm | |
| Plate ratio: 3 | |
| σ s: 50 emu/g | |
| Specific surface area: 55 m$^2$/g | |
| Vinyl chloride copolymer | 5 parts |
| MR555 (manufactured by Nippon Zeon Co., Ltd.) | |
| Polyurethane resin | 3 parts |
| UR8200 (Manufactured by Toyobo Co., Ltd.) | |

-continued

<Manufacture of coating material>

| | |
|---|---|
| α alumina | 10 parts |
| HIT50 (manufactured by Sumitomo Chemical Co., Ltd.) | |
| Particle size: 0.2 μm | |
| Carbon black | 1 parts |
| #55 (manufactured by Asahi Carbon Co., Ltd.) | |
| Mean primary particle diameter: 0.075 μm | |
| Specific surface area: 35 m²/g | |
| DBP oil absorption capacity: 81 ml/100 g | |
| pH: 7.7 | |
| Volatile content: 1.0 percent | |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Nonmagnetic coating material 1 | |
| (for nonmagnetic layer: disk) | |
| Nonmagnetic powder TiO₂ Crystalline rutile | 80 parts |
| Mean primary particle diameter: 0.035 μm | |
| Specific surface area by BET method: 40 m²/g | |
| pH: 7 | |
| TiO₂ content: 90 percent or more | |
| DBP oil absorption capacity: 27 to 38 g/100 g | |
| Surface treatment agent: Al₂O₃, 8 weight percent | |
| Carbon black | 20 parts |
| CONDUCTEX SC-U | |
| (manufactured by Columbia Carbon Co., Ltd.) | |
| Mean primary particle diameter: 0.020 μm | |
| Specific surface area: 220 m²/g | |
| DBP oil absorption capacity: 115 ml/100 g | |
| pH: 7.0 | |
| Volatile content: 1.5 percent | |
| Vinyl chloride copolymer | 12 parts |
| MR110 (manufactured by Nippon Zeon Co., Ltd.) | |
| Polyurethane resin | 5 parts |
| Phenylphosphorous acid | 4 parts |
| Butyl suearate | 10 parts |
| Butoxyethyl stearate | 5 parts |
| Isohexadecyl stearate | 2 parts |
| Stearic acid | 3 parts |
| Methyl ethyl ketone/cyclohexanone (solvent mixed at 1:1) | 250 parts |

Manufacturing Method 1: Disks

For each of the above-described coating materials, the magnetic material, α-alumina, carbon black, vinyl chloride copolymer, and 150 parts of solvent were kneaded in a kneader, the remaining components were added, and the mixture was dispersed for 24 hours which was longer than as conventionally performed using a sandmill with Zr (zirconia) beads 0.1 mmΦ. Polyisocyanate was added to the dispersions obtained: 10 parts to the nonmagnetic layer coating liquid and 10 parts to the magnetic layer coating liquid. A further 40 parts of cyclohexanone were added to each. The mixtures were then passed through a filter having a mean pore diameter of 1 μm to obtain nonmagnetic layer and magnetic layer coating liquids. Simultaneous multilayer coating was performed on a polyethylene terephthalate support 62 μm in thickness having a center surface average surface roughness of 3 nm by applying the nonmagnetic coating liquid obtained in a quantity designed to yield a dry thickness of 1.5 μm and immediately thereafter applying the magnetic coating liquid in a quantity designed to yield a thickness of 0.15 μm. Random orientation was conducted by passing the two layers while still wet through a device generating magnetic fields of alternating intensities of 250 Gauss at a frequency of 50 Hz and 120 Gauss at 50 Hz. Following drying, the product was processed with a seven-stage calender at 90° C. at a linear pressure of 300 kg/cm, punched to a diameter of 3.5 inches, and treated by surface grinding to obtain a disk medium.

Embodiment 2

| | |
|---|---|
| Magnetic coating material 2 (Hexagonal ferrite: tape) | |
| Barium ferrite magnetic powder A (microgranular BaFe) | 100 parts |
| Vinyl chloride copolymer | 6 parts |
| MR555 (manufactured by Nippon Zeon Co., Ltd.) | |
| Polyurethane resin | 3 parts |
| UR8200 (manufactured by Toyobo Co., Ltd.) | |
| α-alumina (particle size: 0.2 μm) | 2 parts |
| HIT60A (manufactured by Sumitomo Chemical Co., Ltd.) | |
| Carbon black (particle size: 0.015 μm) | 5 parts |
| #55 (manufactured by Asahi Carbon Co., Ltd.) | |
| Butyl stearate | 1 parts |
| Stearic acid | 2 parts |
| Methyl ethyl ketone | 125 parts |
| Cyclohexanone | 125 parts |
| Nonmagnetic coating material 2 | |
| (for nonmagnetic layer: tape) | |
| Nonmagnetic powder TiO₂ crystalline rutile | 80 parts |
| Mean primary particle diameter: 0.035 μm | |
| Specific surface area by BET method: 40 m²/g | |
| pH: 7 | |
| TiO₂ content: 90 percent or more | |
| DBP oil absorption capacity: 27 to 38 g/100 g | |
| Surface treatment agent: Al₂O₃, 8 weight percent | |
| Carbon black | 20 parts |
| CONDUCTEX SC-U | |
| (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR8200 (manufactured by Toyobo Co., Ltd.) | |
| Phenylphosphorous acid | 4 parts |
| Butyl stearate | 1 parts |
| Stearic acid | 3 parts |
| Methyl ethyl ketone/cyclohexanone (solvent mixed at 1:1) | 250 parts |

Manufacturing Method 2: Computer Tape

The individual components of the above-described coating materials were kneaded in a kneader and dispersed for 20 hours which was longer than as conventionally performed in a sandmill using Zr (zirconia) beads 0.1 mmΦ. Polyisocyanate was added to the dispersions obtained: 2.5 parts to the nonmagnetic layer coating liquid and 3 parts to the magnetic layer coating liquid. A further 40 parts of cyclohexanone were then added to each. The mixtures were then passed through a filter having a mean pore diameter of 1 μm to obtain nonmagnetic layer and magnetic layer coating liquids. Simultaneous multilayer coating was performed on an aramide support (product name: Mictron) 4.4 μm in thickness having a center surface average surface roughness of 2 nm by applying the nonmagnetic coating liquid in a quantity designed to yield a dry thickness of 1.7 μm and immediately thereafter applying the magnetic coating liquid in a quantity designed to yield a thickness of 0.15 μm. Orientation of the two layers while still wet was conducted with cobalt magnet with a magnetic force of 600 mT and a solenoid with a magnetic force of 600 mT. Following drying, the product was processed with a calender comprising seven-stages of exclusively metal rolls at a temperature of 85° C. and a rate of 200 m/min. Subsequently, a backcoat layer (100 parts of carbon black with a mean particle size of 17 nm and 5 parts of α-alumina with a mean particle size of 200 nm dispersed in nitrocellulose resin, polyurethane resin, and polyisocyanate resin) was applied to a thickness of 0.5 μm. The product was slit to a width of 3.8 mm and the surface of the magnetic layer was cleaned with a tape cleaning device by mounting it on a device equipped with slitted product feeding and winding devices so that a nonwoven fabric and razor blade contacted with a magnetic surface.

Embodiment 3

Fifteen parts of the α-alumina (HIT55 (made by Sumitomo Chemical Co., Ltd.) with a particle size of 0.2 μm) of Magnetic Coating Material 1 (hexagonal ferrite: disk) were kneaded in a kneader and dispersed for 13 hours in a sandmill with Zr (zirconia) beads 0.1 mmΦ. Otherwise, disks were obtained in the same manner as in Embodiment 1.

Embodiment 4

Six parts of the α-alumina (HIT 55 (made by Sumitomo Chemical Co., Ltd.) with a particle size of 0.2 μm) of Magnetic Coating Material 1 (hexagonal ferrite: disk) were kneaded in a kneader and dispersed for 30 hours in a sandmill with Zr (zirconia) beads 0.1 mmΦ. Otherwise, disks were obtained in the same manner as in Embodiment 1.

Comparative Example 1

With the exception that the 100 parts of barium ferrite magnetic powder A (microgranular BaFe) of Magnetic Coating Material 1 (hexagonal ferrite: disk) were replaced with 100 parts of the barium ferrite magnetic powder B described below (coarse granular BaFe), disks were obtained in the same manner as in Embodiment 1.

Barium ferrite magnetic powder B (coarse granular BaFe)

Hc: 2004 Oe

Plate diameter: 0.042 μm

Plate ratio: 4.1

σs: 51.4 emu/g

Comparative Example 2

With the exception that the 100 parts of barium ferrite magnetic powder A (microgranular BaFe) of Magnetic Coating Material 2 (hexagonal ferrite: disk) were replaced with 100 parts of the barium ferrite magnetic powder B (coarse granular BaFe), disks were obtained in the same manner as in Embodiment 2.

Comparative Example 3

With the exception that dispersion was conducted for 4 hours in a sandmill with Zr (zirconia) beads 0.1 mmΦ following kneading in a kneader, disks were obtained in the same manner as in Embodiment 1.

Comparative Example 4

With the exception that coating material 1 was dispersed in a sandmill with Zr beads 1.5 mmΦ instead of Zr (zirconia) beads 0.1 mmΦ, disks were obtained in the same manner as in Embodiment 1.

Comparative Example 5

With the exception that coating material 2 (hexagonal ferrite: tape) was dispersed in a sandmill with Zr beads 1.5 mmΦ instead of Zr beads 0.1 mmΦ, disks were obtained in the same manner as in Embodiment 2.

Measurement Methods

The performance of the magnetic disks and computer tapes prepared as set forth above was evaluated by the following measurement methods.

| 1. Measurement of magnetization turbulence (1) MFM measurement | |
|---|---|
| Device: | Nanoscope III made by DI Co. |
| Mode: | MFM mode |
| Measurement scope: | 40 μm square |
| Scan speed: | 2 Hz/line |
| Lift scan height: | 40 nm |
| Probe: | MESP |
| (Resonance frequency: | 60 to 100 KHz, |
| spring constant: | 1 to 5 N/m, |
| cantilever length: | 225 μm, |
| radius of curvature: | 20 to 40 nm) |

Five fields of view were measured under the above-stated conditions for each sample.

(2) The Ra equation was applied to the magnetic force image to obtain the average value A of magnetization turbulence. The number of magnetic aggregates with a magnetic intensity equal to or greater than 20×A and having a size equal to or greater than 0.5 μm was defined as the magnetization turbulence.

2. S/N Ratio Measurement (1) Disks

Measurement was conducted with recording heads (MIG (metal in gap), gap 0.15 μm, 1.8 T) and reproducing MR heads mounted on a spin stand. DC noise was measured at a rotational number 2,500 to 3,500 rpm at a radius of 30 mm.

(2) Tapes

A tape feeding device on which was mounted a linear head-type head guide assembly carrying commercial MR heads was employed. A signal with a recording wavelength of 0.3 μm was written at a write track width of 27 μm and a tape transfer speed of 3 m/sec. The signal was reproduced with MR heads at a track width of 12.5 μm and the output obtained in a spectrum analyzer and the noise level in the 0 to 12 MHz band were measured to obtain the S/N ratio.

The results are given in the Table 1 below.

TABLE 1

| | Shape | Type of BaFe A: microgranular B: coarsegranular | Dispersion time/hours | Particle diameter of dispersing Zr beads/ mm Φ | Quantity of abrasive/ parts | Magnetic aggregate/ pieces | S/N/ dB |
|---|---|---|---|---|---|---|---|
| Embodiment 1 | Disk | A | 24 | 0.1 | 10 | 34 | 26.2 |
| Embodiment 2 | Tape | A | 20 | 0.1 | 2 | 38 | 25.3 |
| Embodiment 3 | Disk | A | 13 | 0.1 | 15 | 96 | 23.4 |
| Embodiment 4 | Disk | A | 30 | 0.1 | 6 | 21 | 27.0 |
| Comp. Ex. 1 | Disk | B | 24 | 0.1 | 10 | 109 | 20.6 |
| Comp. Ex. 2 | Tape | B | 20 | 0.1 | 2 | 116 | 19.8 |
| Comp. Ex. 3 | Disk | A | 4 | 0.1 | 10 | 147 | 17.3 |
| Comp. Ex. 4 | Disk | A | 24 | 1.5 | 10 | 107 | 20.7 |
| Comp. Ex. 5 | Tape | A | 20 | 1.5 | 2 | 110 | 19.9 |

The results shown in the table above reveal that Embodiments 1 through 4 had equal to or less than 100 magnetic aggregates, resulting in high S/N ratios and good electromagnetic characteristics (equal to or greater than 23 dB for the disks and equal to or greater than 22 dB for the tapes). Comparative Example 1 through 5 had more than 100 magnetic aggregates, resulting in low S/N ratios (equal to or less than 21 dB for the disks and equal to or less than 20 dB for the tapes).

By limiting the number of magnetic aggregates equal to or greater than 0.5 μm in size and having a magnetic intensity equal to or greater than A×20 (where A is the average value of magnetization turbulence) to equal to or less than $100/2,000$ μm$^2$, the present invention can provide a magnetic recording medium capable of suppressing noise, as a result, improving the S/N ratio, and affording good electromagnetic characteristics.

The present disclosure relates to the subject matter contained in Japanese Patent Application No. 2001-246128 filed on Aug. 14, 2001, which is expressly incorporated herein by reference in its entirety.

What is claimed is:

1. A magnetic recording medium comprising a nonmagnetic layer comprising a nonmagnetic powder and a binder and a magnetic layer comprising a ferromagnetic hexagonal ferrite powder and a binder in this order on a support, wherein the number of magnetic aggregates present in the magnetic layer that are equal to or higher than 0.5 μm in size and have a magnetic intensity equal to or greater than 20 times the average value of magnetization turbulence obtained from a magnetic force image measured by a magnetic force microscope is equal to or less than $100/2,000$ μm$^2$.

2. The magnetic recording medium according to claim 1, wherein said number of magnetic aggregates is equal to or less than $50/2,000$ μm$^2$.

3. The magnetic recording medium according to claim 1, wherein said number of magnetic aggregates is equal to or less than $30/2,000$ μm$^2$.

4. The magnetic recording medium according to claim 1, wherein said magnetic layer further comprises an abrasive with a particle size ranging from 0.1 to 0.3 μm.

5. The magnetic recording medium according to claim 1, wherein said magnetic layer further comprises an abrasive with a particle size ranging from 0.1 to 0.2 μm.

6. The magnetic recording medium according to claim 1, wherein said magnetic layer further comprises an abrasive in amount of 1 to 10 parts per 100 parts of ferromagnetic hexagonal ferrite powder.

7. The magnetic recording medium according to claim 1, wherein said magnetic layer further comprises an abrasive in amount of 1 to 4 parts per 100 parts of ferromagnetic hexagonal ferrite powder.

8. The magnetic recording medium according to claim 1, wherein said ferromagnetic hexagonal ferrite powder has a plate diameter equal to or less than 0.038 μm.

9. The magnetic recording medium according to claim 1, wherein said ferromagnetic hexagonal ferrite powder has a plate diameter equal to or less than 0.033 μm.

* * * * *